(12) United States Patent
Faragoi, Jr. et al.

(10) Patent No.: US 9,251,480 B2
(45) Date of Patent: *Feb. 2, 2016

(54) SALES ESTIMATING TOOL FOR BUILDING CONTROL SYSTEM

(75) Inventors: John A. Faragoi, Jr., Glen Ellyn, IL (US); David A. Egbers, Deerfield, IL (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 1154 days.

This patent is subject to a terminal disclaimer.

(21) Appl. No.: 12/959,876

(22) Filed: Dec. 3, 2010

(65) Prior Publication Data

US 2011/0137667 A1 Jun. 9, 2011

Related U.S. Application Data

(60) Provisional application No. 61/266,435, filed on Dec. 3, 2009, provisional application No. 61/266,439, filed on Dec. 3, 2009.

(51) Int. Cl.

| | |
|---|---|
| *G06Q 10/00* | (2012.01) |
| *G06Q 50/00* | (2012.01) |
| *G05B 11/01* | (2006.01) |
| *G05B 21/00* | (2006.01) |
| *G01M 1/38* | (2006.01) |
| *G05B 13/00* | (2006.01) |
| *G05B 15/00* | (2006.01) |
| *G05D 23/00* | (2006.01) |
| *G06Q 10/06* | (2012.01) |
| *G06Q 50/16* | (2012.01) |
| *G06Q 30/02* | (2012.01) |
| *G05B 15/02* | (2006.01) |

(52) U.S. Cl.
CPC .............. *G06Q 10/06* (2013.01); *G05B 15/02* (2013.01); *G06Q 30/02* (2013.01); *G06Q 50/163* (2013.01)

(58) Field of Classification Search
USPC ............... 705/314, 1.1; 700/19, 275; 707/705
See application file for complete search history.

(56) References Cited

U.S. PATENT DOCUMENTS

| | | | | |
|---|---|---|---|---|
| 2002/0026343 A1* | 2/2002 | Duenke | ............................. | 705/8 |
| 2004/0143510 A1* | 7/2004 | Haeberle et al. | ................ | 705/26 |
| 2006/0058923 A1* | 3/2006 | Kruk et al. | .................... | 700/275 |

OTHER PUBLICATIONS

"The Learning Curve Effect," Chapter 2: Economies of Scale and Scope. Mar. 17, 2009. http://media.johnwiley.com.au/product_data/excerpt/45/EHEP0002/EHEP000245-2.pdf.*
U.S. Appl. No. 12/959,926 NPL STIC Search Report. Requested Jul. 2014.*

* cited by examiner

*Primary Examiner* — Mark A Fleischer
*Assistant Examiner* — Johnathan Lindsey, III (57) ABSTRACT

A method for providing an estimate for a defined building control system comprises displaying on a user interface a plurality of areas in which the defined building control system would be installed. A plurality of subsystems are associated with the plurality of areas. The plurality of subsystems include at least one typical subsystem that is associated with a defined plurality of building automation components in a database. The method further comprises displaying on the user interface the typical subsystem in association with the plurality of areas. A number of instances of the typical subsystem that are associated with the plurality of areas is also displayed on the user interface. A cost estimate is generated for the defined building control system based at least in part on the number of instances of the typical subsystem.

19 Claims, 10 Drawing Sheets

SALES ESTIMATING TOOL FOR BUILDING CONTROL SYSTEM

CROSS-REFERENCE TO RELATED APPLICATIONS

This application claims priority from U.S. provisional patent application Nos. 61/266,439 and 61/266,435, both filed Dec. 3, 2009.

FIELD

This application relates to the field of building control systems, and particularly to computer-based tools that generate cost estimates for building control systems.

BACKGROUND

Building control systems (which may also be referred to herein as "building automation systems") are widely used in modern commercial, industrial, and residential building facilities. These building control systems include, for example, fire safety systems and heating/ventilation/air conditioning (HVAC) systems. Because of the unique nature of larger buildings, the building control systems used therein can vary substantially from building to building. As a consequence, there is typically not a set price for a building automation system. It is therefore common practice for building developers to obtain a specific cost estimate that is custom-generated for a new proposed building automation system.

In general, building automation systems can involve large numbers of subsystems distributed throughout a building. Although a building automation system can include several different subsystems, many subsystems can be similar. For example, a space cooling subsystem can involve a controller, one or more temperature sensors, cabling, and the like. A large building may include many of such space cooling subsystems.

Currently, there are two general methods used for cost estimation, both involving generating a database that includes all of the cost-elements (e.g. products or systems) required in constructing the system. A first method creates a separate database entry for each subsystem and/or product involved in the building automation system. For example, if the building system involves forty variable air valve (VAV) subsystems, then the estimation method creates forty database entries, one for each VAV subsystem and all of its associated parts. A second method merely stores quantities of products, parts, or subsystems.

The first method, by including individual entries for each subsystem, allows for use of the information to associate the units with specific areas of the building, so that riser diagrams may be built. Thus, each unit can be associated with a floor or space of the building. The drawback of this method is that it can require a large database that is cumbersome to work with.

The second method, by merely tallying quantities of parts, products or subsystems, is simple to implement. However, the information in the database requires that the entire building automation system be defined by hand (or in some other method), so that part and product counts can be generated. Accordingly, this second method is labor intensive for the user.

In view of the foregoing methods for cost estimation of building control systems, it would be advantageous to provide a cost estimator that allows the user to define a large number of subsystems within the various building areas while using a relatively small database. It would also be advantageous for the cost estimator to easily define the building automation system and easily generate associated part and product counts.

SUMMARY

A system and method for providing an estimate for a defined building control system is disclosed herein. In at least one embodiment, the method comprises displaying on a user interface a plurality of areas in which the defined building control system would be installed. A plurality of subsystems of the defined building control system are associated with the plurality of areas. The plurality of subsystems include at least one typical subsystem that is associated with a defined plurality of building automation components in a database. The method further comprises displaying on the user interface the typical subsystem in association with the plurality of areas. A number of instances of the typical subsystem that are associated with the plurality of areas is also displayed on the user interface. A cost estimate is generated for the defined building control system based at least in part on the number of instances of the typical subsystem.

In at least one embodiment, the database includes the number of instances of the typical subsystem. The number of instances of the typical subsystem in the database may be increased without adding a new subsystem entry in the database in response to a user input indicating that an additional instance of the typical subsystem should be included in one of the plurality of areas. Names for the plurality of subsystems are provided on the user interface, and the name for one instance of the typical subsystem on the user interface may be changed without changing the names for the other instances of the typical subsystem and without changing the number of instances of the typical subsystem in the database. Furthermore, one instance of the typical subsystem may be broken from association with remaining instances of the typical subsystem by reducing the number of instances of the typical subsystem in the database and adding a new subsystem entry in the database that is defined by the same plurality of building components as the typical subsystem. When the new subsystem entry is added, the plurality of building automation components associated with the new subsystem entry may be amended in the database without amending the plurality of building automation components associated with the typical subsystem in the database.

Accordingly, embodiments of the present invention provide a database interface that allows for a building system to be defined in an automated and intuitive manner, while maintaining a database that includes "typical" systems and quantities for each "typical" system. A data file associates each copy of each typical system with a defined space or system. The data file may be used to render the user interface view of the defined system, and may even be used to generate riser diagrams. The database, however, stores subsystem definitions and quantities thereof. It will be recognized that variants of the inventive embodiment may be implemented by those of skill in the art.

The above described features and advantages, as well as others, will become more readily apparent to those of ordinary skill in the art by reference to the following detailed description and accompanying drawings. While it would be desirable to provide a sales estimating tool for a building control system that provides one or more of these or other advantageous features, the teachings disclosed herein extend to those embodiments which fall within the scope of the appended claims, regardless of whether they accomplish one or more of the above-mentioned advantages or include the above-mentioned features.

DESCRIPTION

Figure 9:
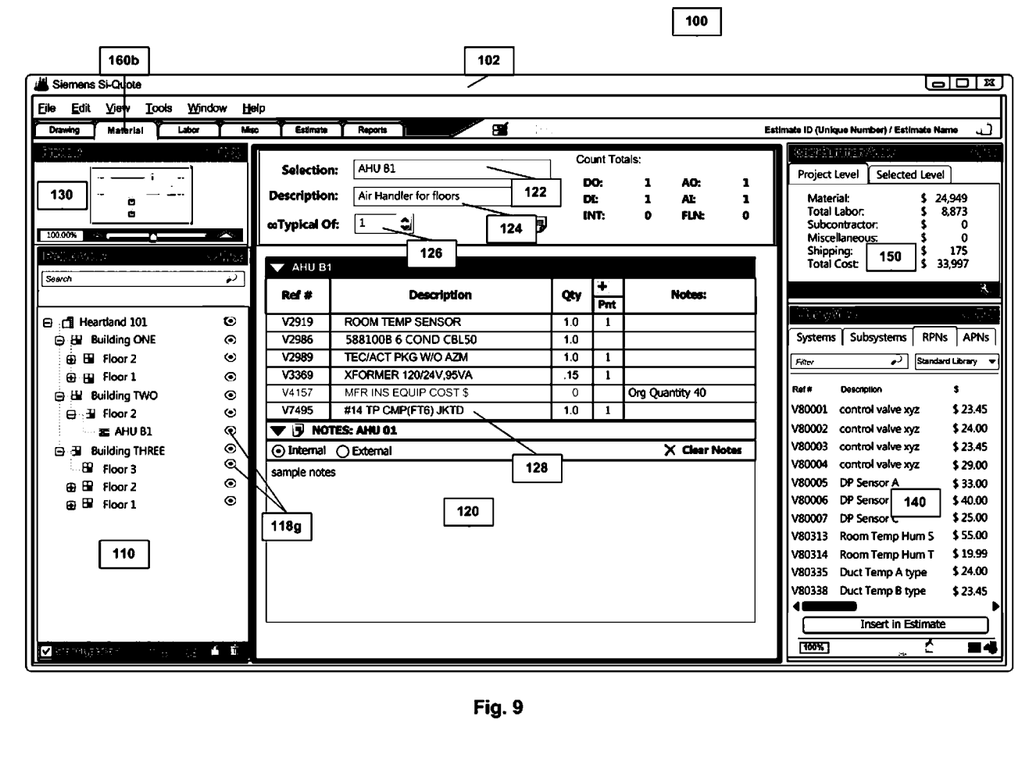
FIG. 9 shows a screen shot of the estimate generator of FIG. 7 showing yet another defined building control system with selectable areas for inclusion in the estimate.
Figure 10:
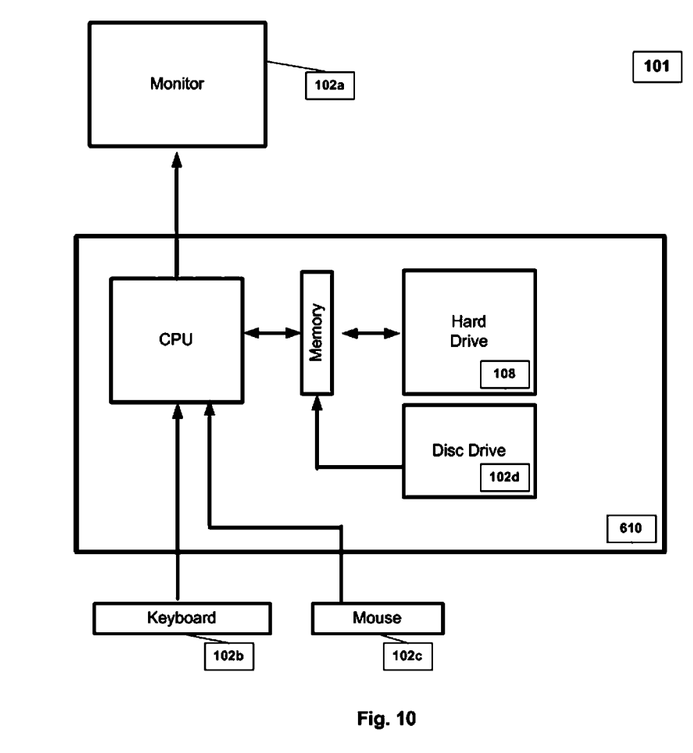
FIG. 10 shows a block diagram of a general purpose computer configured including instructions to control the general purpose computer to act as the estimate generator of FIGS. 1-9.

An exemplary embodiment of a sales estimating tool for a building control system is described herein. The embodiment described herein may readily be an estimate generator that is carried out in a general purpose computer. Instructions for controlling the computer are provide on a computer readable medium that instruct the computer to provide an estimate for a defined building automation system. Accordingly, FIG. 10 shows a block diagram of a general purpose computer 101 as will be recognized by those of skill in the art. The computer 101 includes a user interface 102 having a number of input/output devices such as a screen/monitor 102a, keyboard 102b, mouse 102c, and disc drives 102d. The computer further includes a central processing unit 104, memory 106, and a storage device 108 such as a hard drive. The instructions for controlling the computer to provide the estimate generator may be stored on the storage device 108, memory 106 and/or discs. The microprocessor executes the instructions to cause the general purpose computer to serve as the estimate generator 100 described in further detail below with reference to FIGS. 1-10.

Figure 1:
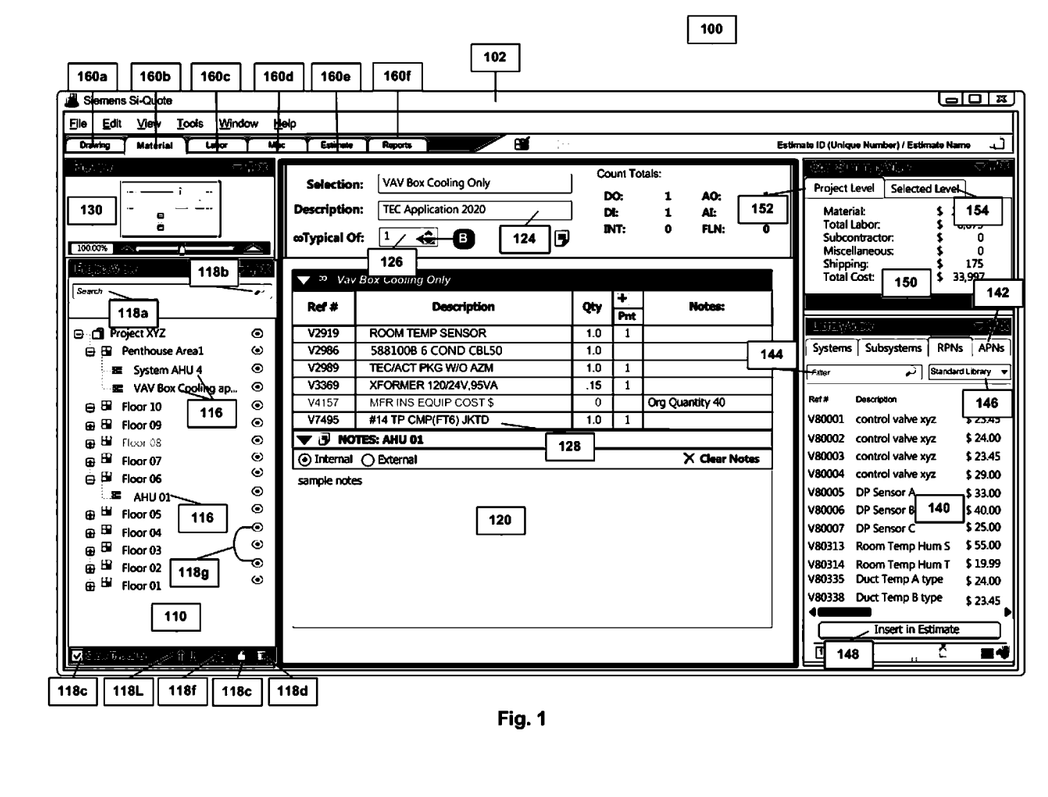
FIG. 1 shows a screen shot of an exemplary embodiment of an estimate generator user interface for a defined building control system.

FIG. 1 shows a screen capture from a user interface 102 of an exemplary estimate generator 100 (i.e. the estimator software executed on a general purpose computer or the like) configured to define a building automation system and provide a cost estimate for such a system. In this embodiment, the user interface 102 is a computer screen that includes a project view box 110, a details box 120, a preview box 130, a library box 140, and a cost summary box 150. Together, the various boxes 120, provided on the user interface 102 allow the user to define a building automation system for a particular building, provide data to the user on the defined system, and provide updated costing information to the user based on the defined system.

Project View Box

With continued reference to FIG. 1, the project view box 110 shows a building control system being estimated, as it is currently defined by the estimate generator 100. To this end, the project view box 110 includes a project name 112, a plurality of area names 114, and a plurality of subsystem names 116. The project name 112 simply identifies the particular building control system that is being defined/estimated. For example, the project name 112 may identify the facility where the building control system being defined will be installed (e.g., Widget Building 3). In the exemplary embodiment of FIG. 1, the project name is "Project XYZ." A building control system in the process of being defined by a user with the estimate generator 100 may sometimes be referred to herein as a system being defined/estimated ("SBDE"). Projects, areas and subsystems of an SBDE may sometimes be referred to herein as "objects".

The plurality of area names 114 identify a plurality of areas within the building where the defined building control system will be installed. Thus, the plurality of area names 114 may be, for example, wings or floors within a building (e.g., floor 1, west wing, etc.). In the embodiment of FIG. 1, the areas of the building are represented in hierarchical fashion by listing area names 114 under the project name 112. However, it will be appreciated that in other embodiments, the areas may be represented differently, such as a graphical representation of the building with floors or other areas represented with or without associated area names 114.

In addition to the project name 112 and the plurality of area names 114, the project view box also 110 also includes a plurality of system names 116 associated with one or more of the area names 114. In the embodiment of FIG. 1, the system names 116 are listed in hierarchical fashion under the area names 114. Each system name 116 identifies a defined collection of a plurality of building automation components. In this document, to avoid confusion with the larger building control system, the systems with system names 116 in various areas 114 may be referred to as "subsystems" with "subsystem names". However, those of skill in the art will recognize that the word "subsystem" in this document refers to what any of various groups of building automation components which are commonly referred to as "systems" or "subsystems".

Subsystems 116 may be default subsystems automatically provided by the estimate generator 100, or unique subsystems defined by the user. In any event, each subsystem 116 is defined by a plurality of building automation components and/or service elements, and the like. Each subsystem, or each of the plurality of components for the subsystem, is associated with a price in an estimate database (not shown in FIG. 1), or other database as described in further detail below. It will be recognized that numerous subsystems with different components are possible. For example, one exemplary subsystem may be defined by a particular air handling unit (AHU) and all parts normally associated with such AHU when installed in a building. Another exemplary subsystem may be defined by a particular variable air volume (VAV) system and all parts normally associated with such VAV system when installed in a building. In FIG. 1, the system being estimated includes the following subsystems with associated subsystem names 116: "System AHU 4", a "VAV Box Cooling Only", and an "AHU 01". The "AHU 4" and "VAV Box Cooling Only" subsystems are located in the penthouse area, while the "AHU 01" is located in the floor 06.

It will be appreciated that the "locations" and "areas" discussed herein relate only to proposed layouts. One purpose of the user interface 102 is to define a possible building automation system. For example, as explained in further detail below, if a user desires to move the "AHU 01" subsystem to a different area, the user may simply drag the "AHU 01" icon to another area name 114. Furthermore, the project view box 110 includes a number of additional tools 118 that allow the user to define and manipulate the SBDE. These tools 118 include a search box 118a, a view selector 118b, a show "Typical Of" selector 118c, a trash/delete icon 118d, a new item icon 118e, a break "Typical Of" link icon 118f, show/hide selectors 118g, and a move item selector 118h. Each of these tools 118 will be explained in further detail below in association with the "System Operation" heading.

Details Box

With continued reference to FIG. 1, the details box 120 is centrally located on the user interface 102 and shows a definition for a selected subsystem or controller shown in the project view box 110 including a name and any constituent parts, products, required service elements and the like. The details box 120 includes a name box 122, a description box 124, a number of instances box 126, and a components box 128. The name box 122 simply identifies a subsystem or controller by name.

In the exemplary embodiment of FIG. 1, the "VAV Box Cooling Only" subsystem is shown in box 122, since it has been highlighted in the project view box 110. The description box 124 provides additional information on the subsystem named in the subsystem name box 122, such as the main component of the subsystem or other subsystem information. For example, in FIG. 1, the description box 124 identifies the primary component of the subsystem as the "TEC Application 2020".

The number of instances box 126 shows the number of times or "instances" that the identified subsystem exists in the SBDE, as currently defined. Accordingly, the instances box 126 shows the user how many times the particular subsystem will be used when arriving at a cost estimate for the SBDE. However, as explained in further detail below, even though a particular subsystem may have multiple instances in the SBDE, the estimate database only contains a single definition of the particular subsystem. The estimate database does not contain definitions for each instance of the particular subsystem. In the example of FIG. 1, the instances box 126 shows a value of 1. This means that the SBDE currently has only one "VAV Box Cooling Only" subsystem and that subsystem is defined only one time in the estimate database. Accordingly, there is only a single instance "VAV Box Cooling Only" subsystem shown in the project view box 110 (see "Penthouse Area1"), which corresponds to the single "VAV Box Cooling Only" subsystem in the estimate database. However, if the instances box 126 showed a value of 7, the SBDE would have seven "VAV Box Cooling Only" subsystems with each instance displayed in the project view box 110, but the subsystem would still be defined only one time in the estimate database. This concept is explained in further detail below under the "Estimate database" subheading. As used therein, the term "typical subsystem" is a subsystem that is defined only once in the database but may include multiple instances in the SBDE. Therefore, all subsystems defined by the user may be considered "typical subsystems", with each typical subsystem having at least one instance that may be increased to a plurality of instances.

The components box 128 lists the building automation components, required service elements, and the like associated with the identified subsystem or controller. In the embodiment of FIG. 1, the components for the identified subsystem include a room temperature sensor, a six conductor cable, a TEC/ACT package, a transformer, and #14 jacketed wire. In addition, the components box 128 may list installation or labor as a component of the subsystem. Each of the plurality of components listed in box 128 is associated with the named subsystem in the estimate database. As mentioned previously, a price may also be associated with each component in the estimate database. Alternatively or in addition, the estimate database may include a single price for the identified subsystem. For example, the price of the identified subsystem may be less than the sum of prices for the individual components. Also, the identified subsystem may be associated with labor and installation costs in the database, which could make the price of the subsystem different from the sum of components for the subsystem.

Preview Box

With continued reference to FIG. 1, the preview box 130 shows a graphical representation of the subsystem shown in the details box 120. Accordingly, in the example of FIG. 1, the preview box shows a graphical representation of the room temperature sensor, six conductor cable, TEC/ACT package, transformer, and #14 jacketed wire connecting the components together. As another example, if an AHU subsystem were listed in the details box 120, the preview box 130 may show a graphical representation of the arrangement of the air handling unit, sensors, conduit, and other components of subsystem.

Library Box

With continued reference to FIG. 1, the library box 140 shows a list of components available in a building automation database (not shown). The user may select one of the tabs 142 in order to show the library in different formats. For example, the APN tab may be selected to list all components in the building automation database by part number and price. Alternatively, the "Subsystems" tab may be selected to list all subsystems currently defined in the building automation database. The building automation database may include numerous subsystems, including standard subsystems available to the user, custom subsystems that may be defined and named by the user, or even custom subsystems defined by other users.

Because the list of items in the building automation database may be relatively large, the user may wish to search for a particular component. This may be accomplished using the search filter 144. Also, the user may select different libraries in the building automation database with the library selection option 146. For example, the user may view only a library that includes only component parts or a library that includes only services (e.g., support, labor, etc.). After identifying a particular desired part or component, the user may select the insert button 148 to include the component in the defined SBDE.

Cost Summary Box

With continued reference to FIG. 1, the cost summary box 150 provides the user with a summary of the estimate for the currently defined project. The cost summary box 150 shows the user a summary of the current estimate at either a project level, an area level, or a subsystem level. For example, if the user selects the "project level" tab 152, a summary of the total project estimate with a few itemized in broad categories (e.g., material, labor, etc.) may be identified in the summary box 150. This allows the user to monitor the total cost of the SBDE as it is currently defined and re-defined by the user. Alternatively, if the user selects the "selected level" tab 154, the user may choose to view the estimated cost associated with one of the defined areas or subsystems. Accordingly, the user may use the cost summary box 150 to obtain details on costs associated with particular areas or subsystems within the SBDE, as currently defined.

As discussed above, the exemplary estimate generator 100 provides the user with a number of different data boxes as the estimate is being created. These boxes include the project view box 110, the details box 120, the preview box 130, the library box 140, and the cost summary box 150. In addition, the estimate generator may allow for additional data boxes or views. For example, the tabs 160a-160f near the top of the screen 102 may allow other data boxes to be substituted for the large components box 128 in the center of the screen in FIG. 1. Thus, if the user selects the "Drawing" tab 160a, the list of subsystem components in box 128 may be substituted for a drawing of the subsystem, such as a larger view of the drawing currently shown in the preview box 130. The user may return to the list of subsystem components by selecting the "Material" tab 160b. Labor costs for the SBDE may be viewed by selecting the "Labor" tab 160c. If the "Estimate" tab 160e is selected, the list of subsystem components in the box 128 may be substituted for an estimate of the selected subsystem or the complete SBDE including components and associated costs. The "Reports" tab 160f may provide the user with access to various reports related to the SBDE. For example, a riser diagram may be generated based on the information in the project view box 110 and database 205. This riser diagram may be provided to the customer along with the detailed estimate. Those of skill in the art will recognize that numerous other options for what is shown in the components box 128 or other boxes of the screen 102.

Estimate Database

As described previously, the details box 120 effectively shows all of the information that is stored in the estimate database for a giving subsystem of the SBDE. Ultimately, the estimate generator 100 assigns or utilizes prices associated with the plurality of subsystems in the estimate database to generate the overall output of a cost estimate for the SBDE.

Figure 2:
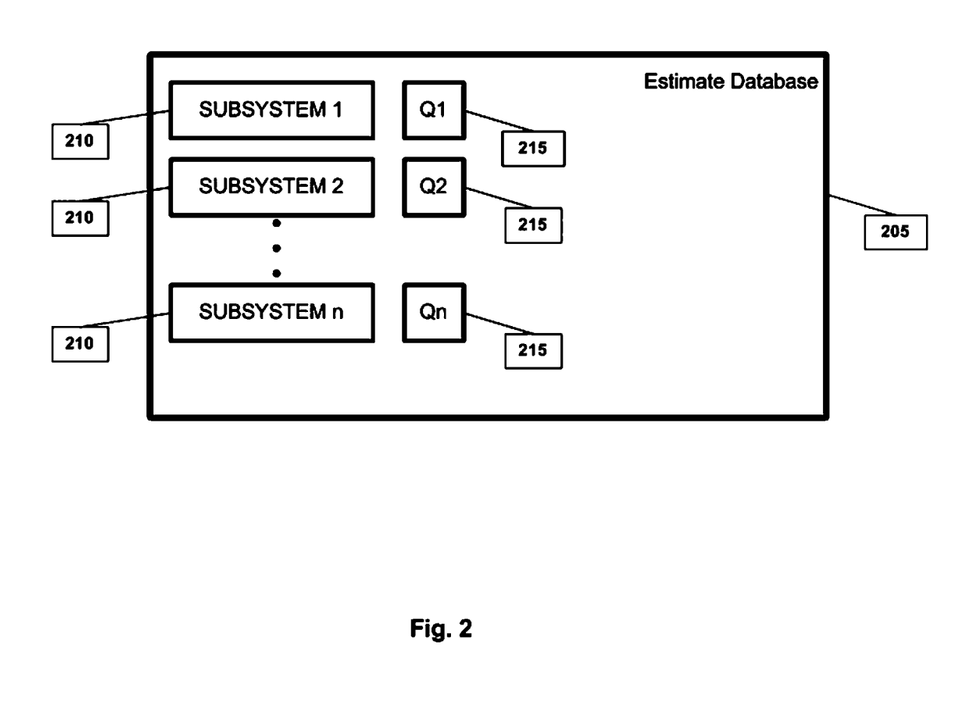
FIG. 2 shows a block diagram of a estimate database for the estimate generator of FIG. 1.

Referring to FIG. 2, a graphical representation of an exemplary estimate database 205 for the estimate generator 100 is shown. As shown in FIG. 2, the estimate database 205 includes a plurality of defined typical subsystem files 210 and a quantity value 215 corresponding to each typical subsystem file. The defined typical subsystem files 210 effectively include the information shown in the details box 120, and may also include price information for each subsystem component/cost-element and/or price information for the subsystem as a whole. Such information may be stored as a separate record in the database, as a link to another database or record, or as part of each individual subsystem record 210.

The quantity value 215 associated with each subsystem file indicates the number of instances for the subsystem in the SBDE. Therefore, it will be recognized that even though a given subsystem includes a plurality of instances, only a single file 210 is contained in the database for each subsystem. Instead of replicating this file for additional instances of the subsystem, the database merely associates the quantity value 215 with each subsystem file 210 in the estimate database 205 in order to represent the number of instances of that subsystem in the estimate database 205.

In contrast to the estimate database 205, the project view box 110 may include additional information that is not stored in the database 205. Referring again to the project view box 110 of FIG. 1, the project view box 110 lists each instance of a typical subsystem defined in the database. However, as explained in further detail below, the user may rename any instance of each typical subsystem for purposes of the project view box 110. Such renaming does not change the underlying subsystem in the database, nor its name in the database. To this end, the estimate generator 100 includes and/or maintains a data file that associates each instance of each typical subsystem with a particular area 114 defined in the project view box 110, along with any user-defined name given to the instance of the typical subsystem. This is discussed in further detail below under the "Arrangement of Instances" subheading.

Area and Subsystem Creation

Further detail regarding the operation of the estimator generator 100 is now provided with reference to FIGS. 1-5. As mentioned previously, the estimator generator provides the user with numerous tools that allow the user to define and manipulate the SBDE. A number of these tools are described below with reference to the project view box 110, the details box 120, the database 205 and data files associated with the project view box 110.

With reference again to FIG. 1, a first exemplary operation a user may perform with the estimate generator 100 is defining the areas 114 for the project 112. This is accomplished in the project view box by clicking on the new item icon 118e. When the user clicks on this icon 118e, he or she is presented with the option to add an area to the project, add a subsystem to an area, or add a controller (i.e., a field panel) for one or more areas or subsystems. After the user selects the type of item to be added, the user selects a location for the new item. If the type of item to be added is an area, a default entry is added as a child of the selected item (e.g., a new floor or wing). If the type of item to be added is a controller or subsystem, the user is prompted to select that item from the library box 140. If the item selected from the library box 140 is a subsystem, details for the subsystem are displayed in the details box 120. Numerous standard subsystems are available from the library box 140. The user may accept these subsystems in their current form or amend them to include additional or fewer components and/or services. Subsystems added to the defined SBDE may be re-named as determined by the user. Accordingly, using the new item icon 118e, the user may generally define areas (e.g., floors and wings of a building) for the project, and add subsystems and controllers to the various areas.

In association with the new item icon 118e, the project view box 110 also includes a trash/delete icon 118d. This icon 118d allows the user to select a previously entered item (e.g., area or subsystem), and then click the delete icon 118d to remove it from the SBDE. A user may also drag and drop an item from the project view box 110 to the delete icon 118d in order to remove the item from the SBDE. If an instance of a typical subsystem is deleted using the trash/delete icon 118d, the instances count for the typical subsystem is decremented by one in the instances box 126.

Adding Instances of a Typical Subsystem

As the user defines the components of the SBDE, the user may wish to add additional subsystems that are identical to one or more subsystems previously created. The subsystems in the estimator database 205 are generally typical subsystems having a number of instances that may be easily changed by the user. As mentioned previously, subsystems capable of having multiple instances are referred to herein as "typical" subsystems. For example, with reference to FIG. 1, assume the user wishes to add additional "VAV Box Cooling Only" subsystems to the SBDE which are identical to the subsystem shown in the details box 120. The user may easily accomplish this by simply changing the number in the instances box 126 from one to a number greater than one. When the user does this, the estimate generator responds by showing the same number of instances of the "VAV Box Cooling Only" subsystem in the project view box 110. In addition to the instances for a subsystem having the same name in the project view box 110, the instances will also be assigned an icon that links the instances to the same subsystem. This will allow the user to identify instances as being linked to the same subsystem even though the names of the instances may be changed, as described in further detail below under the subheading "Name Changes for Instances of Typical Subsystems".

Figure 3:
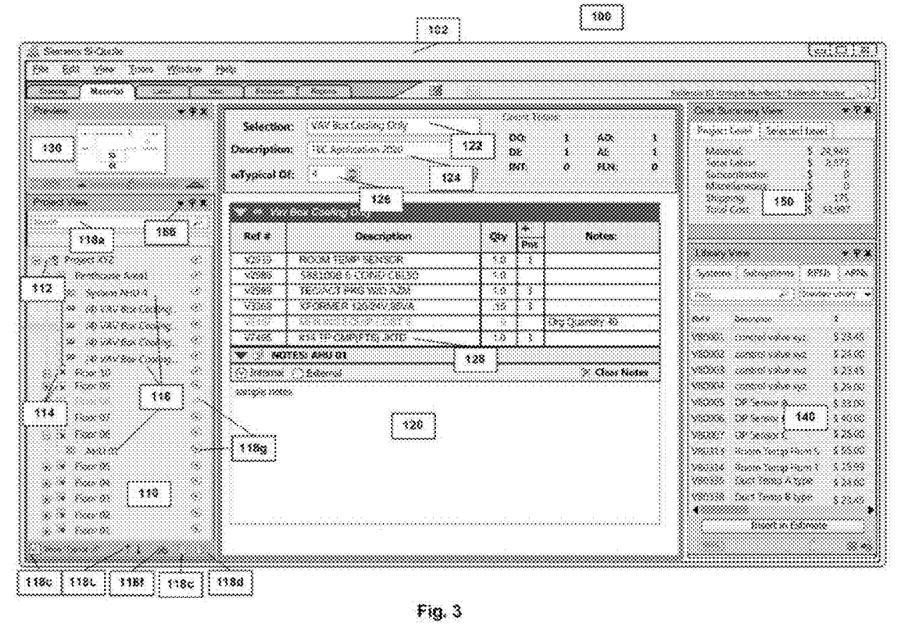
FIG. 3 shows a screen shot of the estimate generator user interface of FIG. 1 with an amended number of instances of a defined typical subsystem.

When a user increases the quantity in the instances box 122, the estimate generator automatically displays the new instances 116 in the same area 114 as the original instance. Thus, as shown in FIG. 3, if the user changes the quantity in the instances box 126 from one to four, the estimate generator, lists three additional "VAV Box Cooling Only" subsystems as separate instances in the project view box 110. By default, these additional instances are also listed in association with "Penthouse Area1" because that is where the original subsystem was located. Thus, the defined SBDE now four instances of the "VAV Box Cooling Only" subsystem, and each of these instances is listed under the "Penthouse Area1" area in the project view box 110. Each instance listed in the project view box includes a number in parenthesis to the left of the named instance. This number also indicates the number of identical instances that are included in the SBDE, as currently defined.

As stated previously, when the user changes the number of instances of a subsystem in the instances box 126, the estimate generator 100 stores this new information in the estimate database 205 (see FIG. 2) by changing the quantity 215 associated with the subsystem file 210 in the estimate database 205. However, the estimate generator 100 does not need to change the actual subsystem file 210 or increase or decrease the number of subsystem files 210 in order to make this change. Accordingly, it will be recognized that the estimate generator is configured to increase the number of instances of the typical subsystem in the database without adding a new subsystem entry in the database in response to a user input indicating that an additional instance of the typical subsystem should be included in one of the plurality of areas. This allows the database to remain relatively small even though numerous instances of subsystems are included in the defined SBDE.

Arrangement of Instances

Figure 4:
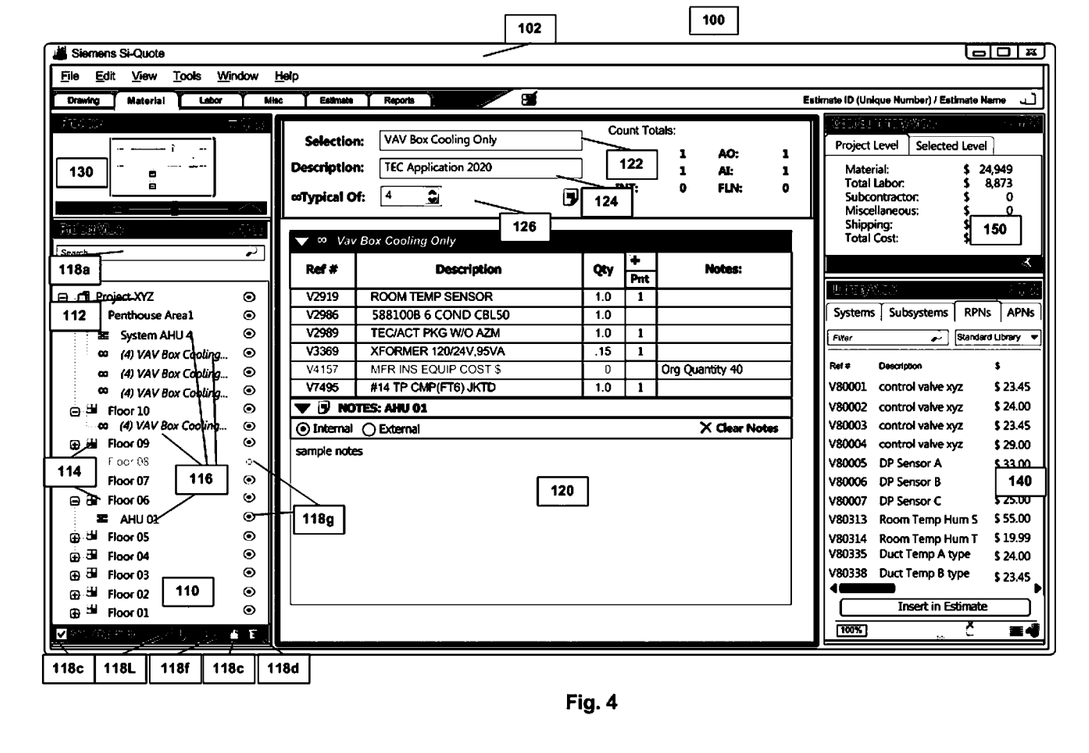
FIG. 4 shows a screen shot of the estimate generator user interface of FIG. 1 with one of the number of instances of the defined typical subsystem moved to another area of the defined building control system.

As explained above, when additional instances of a typical subsystem are created, the estimate generator 100 automatically associates these additional instances with the area of the original instance of the subsystem in the project view box 110. However, it is unlikely that the user wishes for these additional instances to be associated with the same area 114 in the project view box 110 as the original instance. For example, in the exemplary embodiment of FIG. 3, it is not likely that the user intends for all four "VAV Box Cooling Only" subsystems to be located in "Penthouse Area1". Thus, the estimate generator 100 allows the user to easily identify new locations of each additional instance of a subsystem within the project view box 110. In particular, in order to change the location of a particular instance of a typical subsystem, the user may either drag the instance of the subsystem to another desired area 114 or use the move item selector 118*h*. For example, FIG. 4 shows an exemplary screen capture of the user interface 102 where the user has moved one of the four listed instances of the "VAV Box Cooling Only" subsystem into the area defined as "floor 10". This may have been accomplished by dragging the listed instance to the "floor 10" area or by selecting the listed instance and repeatedly clicking on the move item selector 118*h* until the instance arrives at the "floor 10" area. Again, it will be appreciated that nothing in the estimate database 205 has changed as a result of this operation of moving an instance from one area to another in the project view box, as represented in FIG. 4. In particular, there is still only one entry for the "VAV Box Cooling Only" subsystem in the estimate database 205, and the estimate database 205 still lists the subsystem as having four instances. However, as explained in further detain in the following paragraph, the data file that controls the project view box 110 has changed to associate one of the four instances of the "VAV Box Cooling Only" subsystem with area defined as "floor 10", with the remaining three still associated with the "Penthouse Area1".

Figure 5:
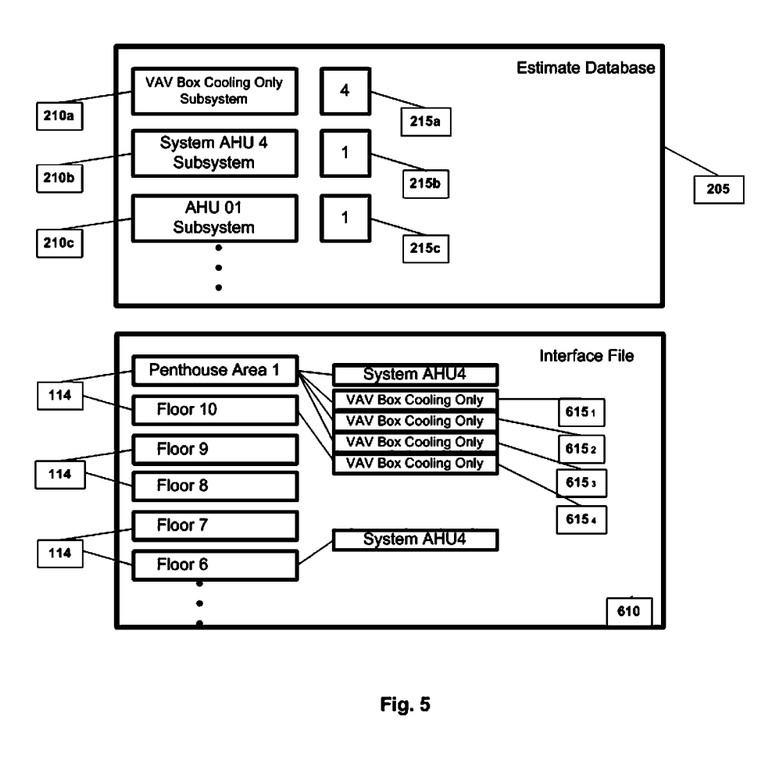
FIG. 5 shows a block diagram of the estimate database of FIG. 2 in association with a project view data file.

With reference now to FIG. 5, another representation of the estimation database 205 is shown in association with a project view data file 610 (which may also be referred to herein as an interface file) in order to demonstrate how the data in FIG. 4 is stored and/or associated by the estimate generator 100. In particular, the database 205 stores the particulars of the "VAV Box Cooling Only" subsystem as a typical subsystem 210*a*, and further stores a quantity of four instances of that subsystem 215*a*. However, the project view data file 610 associates four instances $615_1$, $615_2$, $615_3$, $615_4$ of the "VAV Box Cooling Only" subsystem 615 with one or more areas 114 defined in the project view data file 610. In particular, the project view data file 610 associates instances $615_1$, $615_2$, and $615_3$ with "Penthouse Area1", and associates instance $615_4$ with "Floor 10". Also, the one instance of "System AHU 4" is associated with "Penthouse Area1", and the one instance of "AHU 1" is associated with "Floor 6". The project view data file 610 reflects this arrangement of the subsystems "VAV Box Cooling Only", "AHU1" and "System AHU4" in the project view box 110 of FIG. 4. While only these subsystems are shown in FIG. 4 for simplicity, it will be recognized that the data file 610 will typically include associations between numerous subsystems and areas.

As described previously, the user may use the details box 120 in order to define a new typical subsystem, or use the instances box 126 change the number (quantity) of an existing typical subsystem. Both the data base 205 and the project view interface file 610 change whenever a new typical subsystem is defined, or when the quantity of a typical subsystem is changed. The user may also employ the details box 120 to change actual definition of a typical subsystem in the estimate database 205. Changes made in the details box 120 (such as adding another component) will affect all instances of that typical subsystem because the subsystem definition 210 in the estimate database 205 is changed. In addition, it is possible to define a new typical subsystem using data modified from an existing typical subsystem, as explained in further detail below under the subheading "Breaking Instances from Typical Subsystems".

As discussed previously, the user may employ the project view box 110 to change the layout of instances within the SBDE. User changes in the project view box 110 affect the project view data file 610, but not typically the estimate database 205. For example, the project view data file 610 will change if the user employs the project view box 110 to change areas associated with instances of typical subsystems, change the names of instances of typical subsystems, or add or define new "areas" 114, or subareas thereof. However, with each of the actions in the foregoing sentence, the database 605 would not change.

Name Changes for Instances of Typical Subsystems

In certain situations, a user may which to change a name of an instance of a typical subsystem. For example, a user may wish to make the name more descriptive. Accordingly, with reference to FIG. 4, a user may wish to change the name of instance $615_4$ from "VAV Box Cooling Only" to "VAV Box Cooling 10" in indicate the association between the instance and floor 10. To accomplish this, the user simply selects the name of the instance to be changed (e.g., the VAV Box Cooling Only" instance associated with floor 10) in the project view box 110 such that information for the subsystem shows up in the details box 120. The instance appears in the subsystem name box 122. The user may then input a new desired name for the instance using a keyboard (e.g., "VAV Box Cooling 10").

Even after the name of a selected instance has been changed such that it is different from the other instances for the subsystem, the instance with the changed name will still be associated with the other instances in the estimate database 205. Indeed, a changed name for one instance will result in no change in the estimate database. Accordingly, the instances box 126 in the subsystem view 120 will still show the same number of instances for the subsystem (e.g., in the example of FIG. 4, four instances). Additionally, the project view box 110 will continue to indicate an association between the four differently named instances, by maintaining the same icon next to each named instance for the subsystem. Accordingly, it will be recognized that the estimate generator is configured to change the name for one instance of the typical subsystem on the user interface without changing the names for the other instances of the typical subsystem and without changing the number of instances of the typical subsystem in the database.

Breaking Instances from Typical Subsystems

In certain situations, a user may which to break a particular instance of a subsystem from its link to other instances. For example, a user may recognize that a second instance of a subsystem on floor 5 needs to be different than a first instance of a subsystem on floor 10, even though the subsystems are linked. If this is the case, the user may easily break the second instance of the subsystem from its association with all other instances by selecting the instance in the project view box 110 and then selecting the break "Typical Of" link icon 118f (see FIG. 1). When the user performs this action, the selected instance becomes a new instance associated with a new subsystem entry 210 in the estimate database 205. This new subsystem entry will be distinct from other subsystem entries in the estimate database (including the old subsystem entry that the selected instance was previously associated with). The new subsystem will initially have only a single instance. Similarly, the instances of the old subsystem will be decremented by one as a result of the selected instance being broken from association with the old subsystem. Initially, the new subsystem will be defined by the same components as the old subsystem. However, the user is free to amend the new subsystem by adding components, removing components, changing names, etc. without any effect on the subsystem entry.

Accordingly, as explained above, it will be recognized that the estimate generator is configured to break one instance of the typical subsystem from association with remaining instances of the typical subsystem by reducing the number of instances of the typical subsystem in the database and adding a new subsystem entry in the database that is associated with the same plurality of building components as the typical subsystem. Furthermore, the estimate generator is configured to amend the plurality of building automation components associated with the new subsystem entry in the database without amending the plurality of building automation components associated with the typical subsystem in the database.

Automatic Field Panel Sizing

The estimate generator also provides the user with the option to automatically calculate a proper sized controller (i.e., field panel) required to support the defined systems in the selected area. In particular, as the user adds additional instances of a given subsystem to different areas within the SBDE, the estimate generator includes a subroutine that calculates different field panels that may be available for a given area based on the type and quantity of subsystems and other components in the given area. If the user has defined an acceptable field panel within the given area, no action will be taken by the estimate generator. However, if a user has not selected a field panel for a given area, or has defined an improper field panel for the given area, the estimate generator may provide a pop up box instructing the user to select a field panel for the given area from a list.

Additional Estimation Generator Tools

In addition to the foregoing, the estimation generator also provides several other tools to assist the user in defining the SBDE and arriving at an estimate. For example, as the user defines the SBDE, one operation the user may wish to perform is a search using the search box 118a. The search box 118a acts like a filter and allows the user to show only certain types of components in the project view box 110. For example, if a user would like to see all items with a VAV, the user may type "VAV" in the search box 118a, and only items with a VAV will appear in the project view box along with the associated areas. After completing a search, the user may click on the "x" to clear the search and return to a full display in the project view box 110.

The project view box 110 also offers the user with a view selector 118b, which allows the user to view the define project in different ways. For example, if the user selects the icon for the view selector 118b, the user may be presented with the option to view the defined SBDE as a hierarchical view (as shown in FIG. 1) or a graphical view. The hierarchical view presents the defined SBDE as a representation that follows a hierarchical perspective (i.e., job-area-systems). If the graphical view is selected, a more graphical and illustrative view of the defined automation system may be shown.

Another available tool in the project view box 110 is the show "Typical of" option 118c. When the user selects this option 118c, all instances of typical subsystems are shown in the project view box. However, if this option 118c is not selected, only one instance of each typical subsystem is shown in each area. In this case, the total number of instances of a particular typical subsystem in a given area is shown next to the instance name. This generally offers the user a cleaner view in the project view box 110 by limiting the number of times a typical subsystem is shown for each area.

Cost Estimates

As the user defines the SBDE, the estimate generator 100 continually provides an updated estimate for the defined system in the cost summary box 150. However, when the user reaches a point where the system is completely defined and a detailed estimate is desired, the user may select the "Estimate" tab (160e in FIG. 1) and the user may choose to obtain a more detailed cost estimate for the SBDE or subsystem than what is shown in the cost summary box 150. This detailed estimate may be printed or saved by the user for review by a customer.

Because the estimate generator 100 maintains information on the number of instances for each typical subsystem, the estimate generator may also incorporate labor efficiencies into the estimates. For example, if seven instances of a particular typical subsystem are defined in the SBDE, the estimate generator may recognize that labor charges associated with installation of instances two through seven will be less than the labor charges associated with instance one (as a result of inherent cost savings for replicating systems on a job). Accordingly, the estimate generator may be configured to automatically reflect these labor efficiencies in the estimate provided to the user.

Alternate Estimates

Yet another group of tools available to the user in the project view box 110 are the show/hide selectors 118g. These selectors 118g allow the user to hide areas and systems. When hidden, an area or subsystem is still shown in the project view box 110, but it is not used to provide the cost estimate. In particular, when the user indicates that a particular area or subsystem should be hidden, any components, labor, etc. that are associated with the area or subsystem are not used by the estimate generator to arrive at the estimated cost of the SBDE. Accordingly, if an estimate is generated with a particular area or system hidden, this area will not be listed as part of an estimate report submitted to a customer (or if it is listed, an explanation will be provided that it is not included in the cost estimate). A user may toggle between hiding or showing a particular area or subsystem in the estimate by simply clicking on the show/hide selector 118g next to the area or subsystem in the project view box 110. Again, even though an area or system is marked as hidden, it will still be shown in the project view box 110, and a user may click on the area or subsystem to view its details in the detail box 120. This is different from other graphic editors which completely remove an area or system from view on the user interface if it is not selected, and do not allow unselected items to be edited. To the contrary, unselected areas or systems are visible and may still be edited right alongside selected areas on the user interface. As explained in further detail below, the show/hide selectors 118g provide the user with the ability to easily produce multiple estimate scenarios for a single SBDE.

Figure 6:
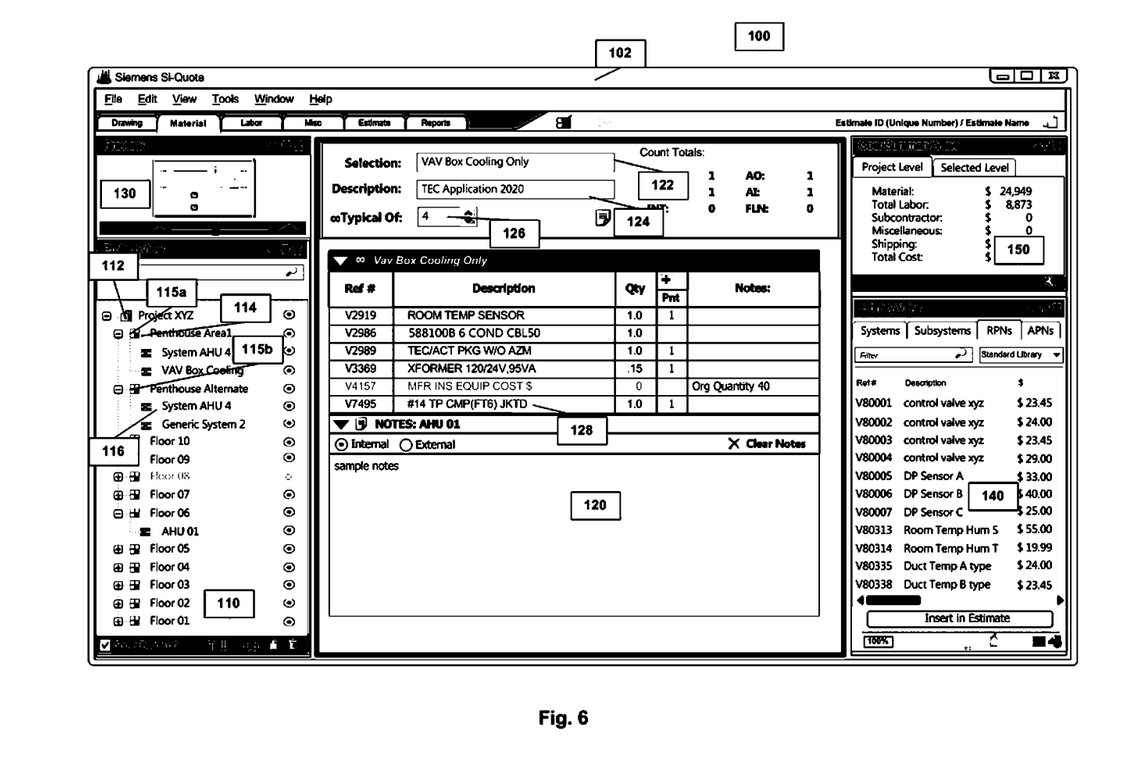
FIG. 6 shows a screen shot of the estimate generator user interface of FIG. 1 showing an alternate penthouse area defined in the project view box.

With reference now to FIG. 6, a screen capture or wireframe of the estimate generator user interface 102 is shown. The SBDE in FIG. 6 is the same as that of FIG. 1, but the SBDE in FIG. 6 includes an alternate area 115b (i.e., "Penthouse Alternate"). In this embodiment, the estimate generator 100 obtains the information for the cost estimate from the database 205, and to some degree, the project view data file 610, as discussed previously with reference to FIGS. 1-5. As explained in further detail below, the existence of the show/hide selector 118g allows the user to easily produce various alternate estimates for the SBDE.

With continued reference to FIG. 6, the estimate generator 100 may suitably update the cost summary box 150 by appropriate processing of the information in the data base 205 regarding subsystems, their component parts, their cost, and quantity. However, in this embodiment, the estimate generator 100 excludes from any displayed estimate any element or group of elements that are "hidden" in the project view box 115. For example, in FIG. 6, it can be seen that there are two defined "penthouse areas", the "Penthouse" 115a and the "Penthouse Alternate" 115b. These alternatives define different possible configurations for the penthouse area. Such alternatives give a potential buyer options in costs and equipment.

In the example of FIG. 6, the "Penthouse Alternate" 115b has been hidden by the user using any suitable computer interface technique. Thus, the estimate in the cost summary box 150 does not include the costs associated with the "Penthouse Alternate" 115b, which is also shown as "hidden" in the project view box 115. To this end, the estimate generator does not merely generate the estimates 150 based on all of the information in the database 205, but rather based on the information in the database 205 as modified by identification of any areas 114 or other subsystems 116 or groupings that are not to be included in the estimate. Information about which areas 114, subsystems 116 or groupings that are to be excluded from the estimate (i.e. are hidden) can be provided in the project view data file 610.

Figure 7:
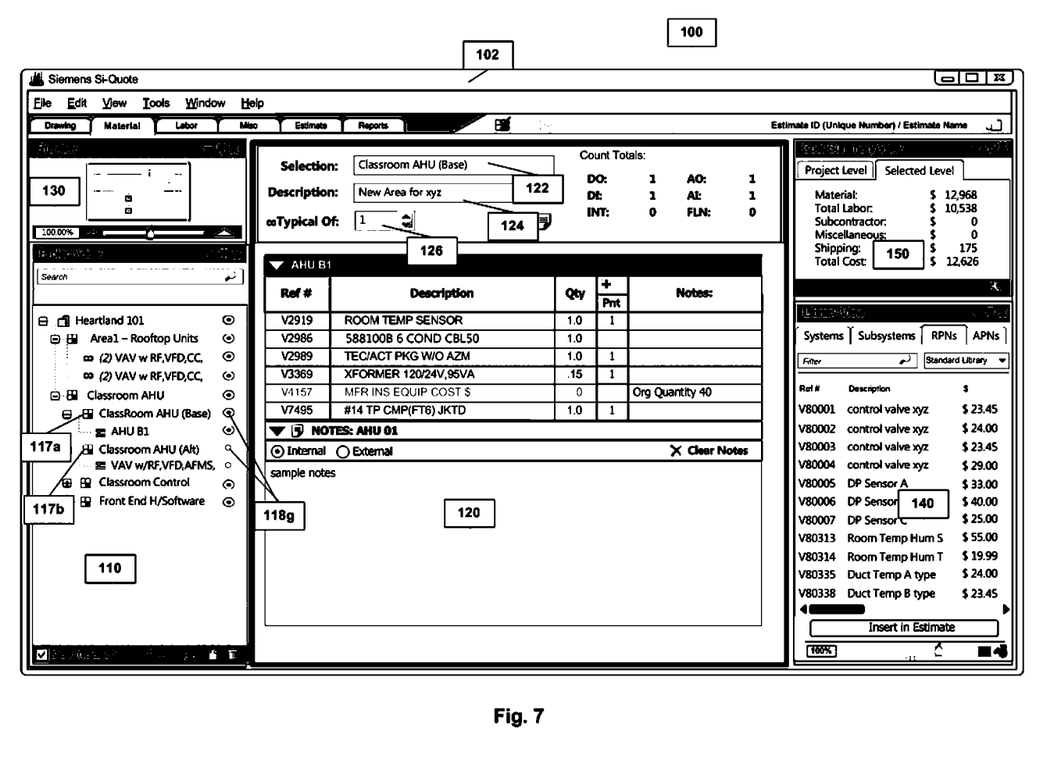
FIG. 7 shows a screen shot of the estimate generator user interface of FIG. 1 with a differently defined building control system including an alternative area displayed in the project view box.

With reference now to FIG. 7, another exemplary embodiment of the user interface 102 is shown in association with a different SBDE. In this embodiment, the project name is "Heartland 101". The SBDE has been defined by the user in the project view to include two different systems with different building components in the "Classroom AHU" area. The first possible system 117a is identified as "Classroom AHU (Base)" (also referred to herein as the base system 117a). The second possible system 117b is identified as "Classroom AHU (Alt)" (also referred to herein as the alternative system 117b). Various differences may exist between the base system 117a and the alternative system 117b. For example, the base system 117a may include only the minimum of components that would be required for this area compliant with local building codes. The alternative system 117b may include a number of different and/or additional components that are desired but are not necessarily required for compliance with local building codes. Alternatively, the base system 117a may be the more preferred system and the alternative system 117b may be the more basic system.

As shown in FIG. 7, both the base system 117a and the alternative system 117b include a show/hide selector 118g to the right of the name in the project view box 110. The user has selected the "ClassRoom AHU (Base)" system 117a, and has deselected/hidden the "ClassRoom AHU (Alt)" system 117b. Because of this, the selected "ClassRoom AHU (Base)" system 117a will be included in any cost estimates generated by the estimate generator, but the unselected/hidden "ClassRoom AHU (Alt)" system 117b will not be included in any cost estimates generated by the estimate generator. However, any deselected systems are not removed from the project view box 110, allowing the user to keep these alternative systems in mind and consider selecting these systems for future estimates. Thus, if the user wishes to view the alternate system 117b as part of the cost estimate instead of the base system 117a, the user simply clicks the show/hide selector 118g next to "ClassRoom AHU (base)" to deselect the base system 117a, and clicks the show/hide selector 118g next to "ClassRoom AHU (Alt)" to select the alternate system 117b. Moreover, if the user wishes to see both the base system 117a and the alternative system 117b in the estimate, both systems may be selected with the show/hide selector. Accordingly, the user may easily obtain alternate estimates for the SBDE by working with the show/hide selector 118g on the user interface 102, and easily weigh the advantages and disadvantages (namely cost) identified with different systems. The ability of the estimate generator to produce alternative estimates does not require any area or subsystem to be identified as an "alternative" area or have any other distinction in the estimate database 205. Instead, the project view data file 610 will be changed each time the user clicks on the show/hide selector, and the estimate generator can easily prepare new estimates based on the data in the estimate database 205 and the project view data file 610.

The discussion above with respect to FIG. 7 recognizes that alternative systems may be based on different building automation components. However, it will also be recognized that alternative systems may be based on different subcontractors or installation options. In particular, because different subcontractors may have different labor costs, different fees, different material charges, or even different processes for installation of a system, the difference in cost between two different contractors may be significant. Accordingly, the estimate generator 100 is configured to allow a user to set up a base system and one or more alternate systems for a given area where one difference between the systems is the subcontractor that will install the system. For example, with reference to FIG. 8, the user has again defined two different systems in the "Classroom AHU" area shown in project view box 110. The first system is the "Classroom AHU (Base)" system 117a, and the second system is the "Classroom AHU (Alt)" system 117b. In addition to any component differences between these systems (as described above with reference to FIG. 7), these two systems 117a and 117b may also be set up for different subcontractors. When one of the two systems is selected in the project view box 110, the user is able to define different subcontractor expenses associated with installation of the systems by clicking on the "Misc" tab 160d. When the user clicks on this tab 160d, a "Subcontractors" box 162 appears in the details box 120. This box 162 includes the costs that a selected subcontractor may charge for various services or materials. Again, these costs may vary from one subcontractor to the next, so the user may incorporate potential alternate subsystems into the SBDE and choose different subcontractors for the alternate subsystems. The user may then generate alternate estimates for the SBDE using the show/hide selector 118g, as described above with reference to FIG. 7.

Figure 8:
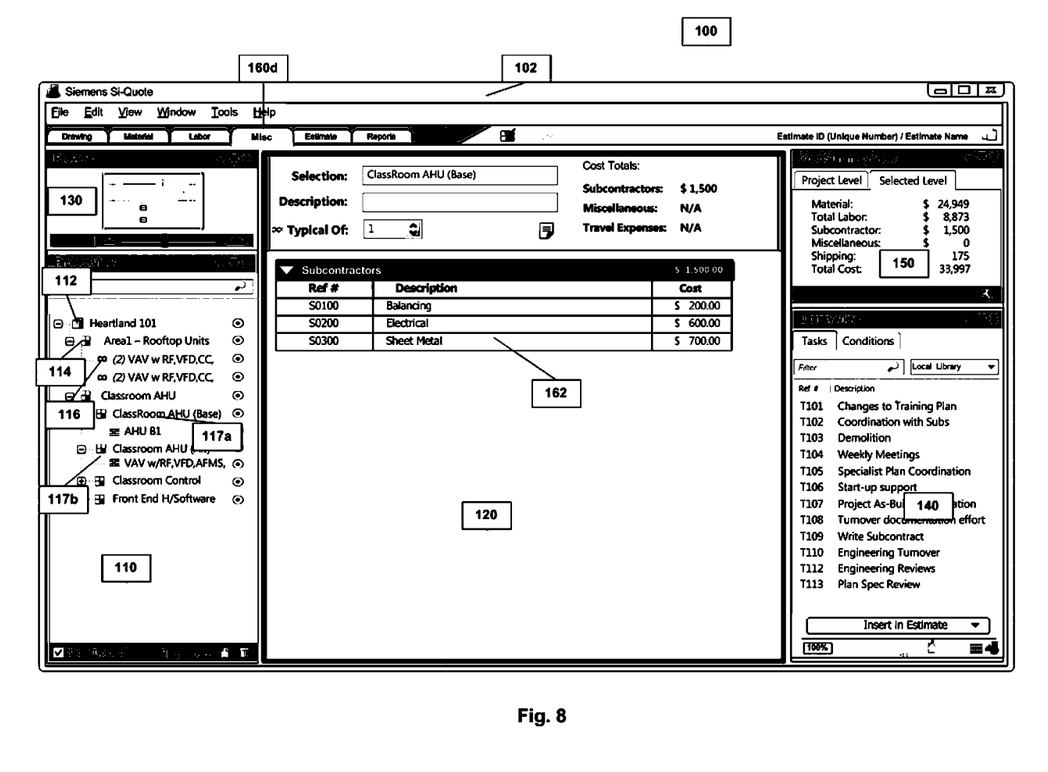
FIG. 8 shows a screen shot of the estimate generator of FIG. 7 showing subcontractor information in a details box.

Even if a user sets up alternate systems for installation by a single contractor, alternate systems that have different components may still result in different subcontractor costs. For example, installation of one AHU may be somewhat more expensive than a different AHU. FIG. 8 illustrates that a user may view these differences in subcontractor costs when any alternative systems are defined, even if different subcontractors are not used.

In addition to providing estimates for alternative systems, the estimate generator 100 also provides the user with the ability to calculate phased job estimates. With phased job estimates, the user may estimate how much it will cost to install a complete SBDE in different phases over time. An example of this is shown in FIG. 9 where the user has defined a different SBDE than that shown in the previous figures. In the embodiment of FIG. 9, the project name is again "Heartland 101". However, the SBDE has been defined by the user in the project view box 110 to include three different buildings, i.e., Building One 119a, Building Two 119b and Building Three 119c.

In the example of FIG. 9, the customer wishes to renovate each of the three buildings 119a, 119b, and 119c. However, the customer only has only limited financial resources, and will not be able to complete all three buildings at one time. Therefore, using the show/hide selector 118g, the user may estimate the job in phases, including additional phases over time. Accordingly, the user may define the complete SBDE for all three buildings 119a, 119b, and 119c, and using the show/hide selector 118g, provide separate estimates for the three buildings. The customer may then select one of the three buildings to proceed forward with at the present time (e.g., Building One 119a), saving the other buildings for later. Then, at a later time when the customer has the financial resources to proceed with the other buildings, the project may then be reopened by the user, and new estimates for the other buildings may be easily provided using the show/hide selector 118g. For example, if an estimate for Building Two 119b is desired, the user may hide Building One 119a (which may already be complete) and Building Three 119c (which will be completed later) with the show/hide selector, and select Building Two 119b in order to provide a cost estimate for Building Two.

The foregoing detailed description of one or more embodiments of the sales estimating tool for a building control system has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A method for providing an estimate for a defined building control system, the method comprising:
displaying on a user interface a plurality of areas for the defined building control system;
associating a plurality of subsystems of the defined building control system with the plurality of areas, the plurality of subsystems including a typical subsystem defined by a subsystem file, wherein the subsystem file identifies a plurality of building automation components in a database and is associated with a number of instances of the typical subsystem;
displaying on the user interface the typical subsystem in association with the plurality of areas;
displaying a number on the user interface indicative of the number of instances of the typical subsystem that are associated with all of the plurality of areas; and
generating within a processing unit a cost estimate for the defined building control system based at least in part on the number of instances of the typical subsystem.

2. The method of claim 1 wherein the user interface includes a screen and the plurality of areas are displayed as a list of areas on a first portion of the screen.

3. The method of claim 1 wherein the database includes the number of instances of the typical subsystem but does not include more than one file defining the typical subsystem.

4. The method of claim 3 further comprising increasing the number of instances of the typical subsystem in the database without adding a new subsystem entry in the database in response to a user input indicating that an additional instance of the typical subsystem should be included in one of the plurality of areas.

5. The method of claim 4 wherein names for the plurality of subsystems are provided on the user interface, the method further comprising changing the name for one instance of the typical subsystem on the user interface without changing the names for the other instances of the typical subsystem and without changing the number of instances of the typical subsystem in the database.

6. The method of claim 4 further comprising,
breaking one instance of the typical subsystem from association with remaining instances of the typical subsystem by reducing the number of instances of the typical subsystem in the database and adding a new subsystem entry in the database that is associated with the same plurality of building components as the typical subsystem; and amending the plurality of building automation components associated with the new subsystem entry in the database without amending the plurality of building automation components associated with the typical subsystem in the database.

7. The method of claim 1 wherein the number of instances of the typical subsystem is a first number of instances associated with all of the plurality of areas, wherein a second number of instances of the typical subsystem is associated with one of the plurality of areas, the second number of instances less than the first number of instances, the method further comprising determining within the processing unit a field panel for the one of the plurality of areas based at least in part on the second number of instances of the typical subsystem.

8. The method of claim 7 wherein the cost estimate lists the determined field panel for the one of the plurality of areas.

9. The method of claim 1 wherein the cost estimate includes a list of building automation components for the defined building control system, a quantity of each of the building automation components, and an associated price for the quantity of each of the building automation components.

10. The method of claim 1 wherein at least one instance of the typical subsystem is displayed on the user interface in association with a first of the plurality of areas and at least a second instance of the typical subsystem is displayed on the user interface in association with a second of the plurality of areas.

11. The method of claim 1 wherein a first instance of the typical subsystem is displayed on a first screen portion with a first name and a second instance of the typical subsystem is displayed on the first screen portion with a second name that is different from the first name.

12. The method of claim 1, further comprising displaying the generated cost estimate on the user interface.

13. A method for providing an estimate for a defined building control system, the method comprising:

displaying on a user interface a plurality of areas for the defined building control system;

associating a plurality of subsystems of the defined building control system with the plurality of areas, the plurality of subsystems including a typical subsystem that is associated with a defined plurality of building automation components in a database, the database including a number of instances of the typical subsystem and only a single file defining the typical subsystem, the number of instances being greater than one;

displaying on the user interface the typical subsystem in association with the plurality of areas;

indicating a number of instances of the typical subsystem that are associated with all of the plurality of areas; and generating within a processing unit a cost estimate for the defined building control system based at least in part on the number of instances of the typical subsystem.

14. The method of claim 13 wherein the user interface includes a screen and the plurality of areas are displayed as a list of areas on a first portion of the screen.

15. The method of claim 13 further comprising increasing the number of instances of the typical subsystem in the database without adding a new subsystem entry in the database in response to a user input indicating that an additional instance of the typical subsystem should be included in one of the plurality of areas.

16. The method of claim 15 wherein names for the plurality of subsystems are provided on the user interface, the method further comprising changing the name for one instance of the typical subsystem on the user interface without changing the names for the other instances of the typical subsystem and without changing the number of instances of the typical subsystem in the database.

17. The method of claim 15 further comprising, breaking one instance of the typical subsystem from association with remaining instances of the typical subsystem by reducing the number of instances of the typical subsystem in the database and adding a new subsystem entry in the database that is associated with the same plurality of building components as the typical subsystem; and amending the plurality of building automation components associated with the new subsystem entry in the database without amending the plurality of building automation components associated with the typical subsystem in the database.

18. The method of claim 13 wherein the number of instances of the typical subsystem is a first number of instances, wherein a second number of instances of the typical subsystem is associated with one of the plurality of areas, the second number of instances less than the first number of instances, the method further comprising determining within the processing unit a field panel for the one of the plurality of areas based at least in part on the second number of instances of the typical subsystem.

19. The method of claim 13 wherein the cost estimate includes a list of building automation components for the defined building control system, a quantity of each of the building automation components, and an associated price for the quantity of each of the building automation components.

* * * * *